R. FOX.
CORN-PLANTER.

No. 189,932. Patented April 24, 1877.

WITNESSES:
H. Rydquist
J. H. Scarborough

INVENTOR:
Rob't Fox
BY
[signature]
ATTORNEYS.

N. PETERS, PHOTO-LITHOGRAPHER, WASHINGTON, D. C.

UNITED STATES PATENT OFFICE.

ROBERT FOX, OF DEERFIELD, IOWA.

IMPROVEMENT IN CORN-PLANTERS.

Specification forming part of Letters Patent No. 189,932, dated April 24, 1877; application filed February 3, 1877.

*To all whom it may concern:*

Figure 1:
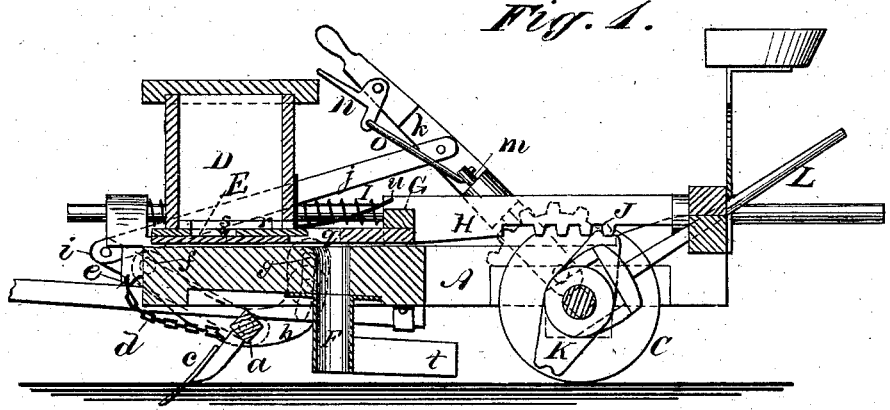
Figure 2:
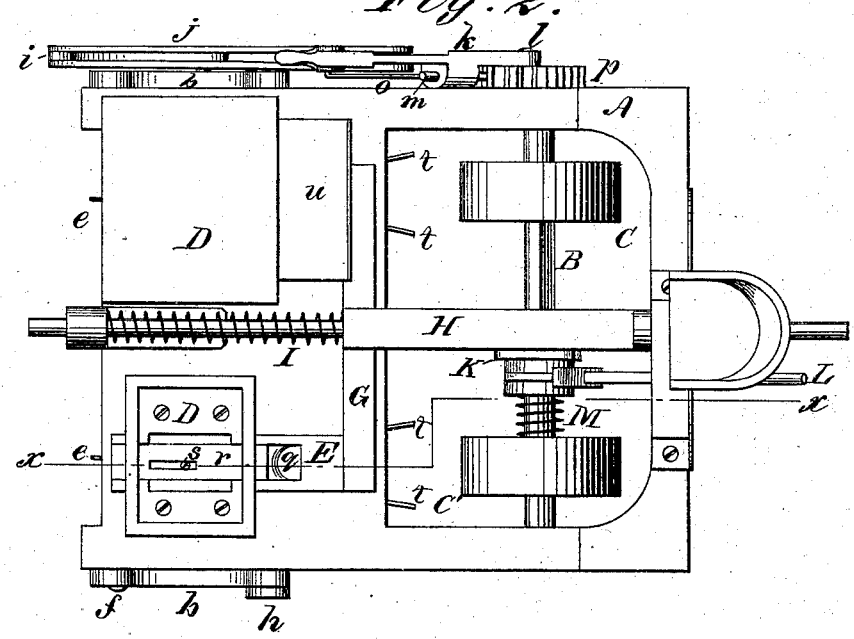

Be it known that I, ROBERT FOX, of Deerfield, in the county of Chickasaw and State of Iowa, have invented a new and Improved Corn-Planter, of which the following is a specification:

Figure 1 is a side elevation, in section, on line $x\ x$ in Fig. 2. Fig. 2 is a plan view.

Similar letters of reference indicate corresponding parts.

My invention relates to improvements in corn-planters; and it consists in an arrangement of plows on an adjustable shaft, by turning which the plows are raised or lowered.

In the drawing, A is the frame of the machine, supported by the shaft B, upon which the wheels C C' are placed. At the front of the machine a shaft, $a$, is journaled in adjustable supports $b$, and to this shaft plows $c$ are attached.

$d\ d$ are chains fastened to the shanks of the plows, and engaged by hooks $e$, that project from the front of the frame A. The supports $b$ of the shaft $a$ are pivoted to the frame A at $f$, and are curved and provided with slots $g$, through which clamping-screws $h$ pass into the frame A. The shaft $a$ is provided with a lever, $i$, that is connected, by rods $j$, with a lever, $k$, that is pivoted at $l$, and provided with a spring-bolt, $m$, and a hand-lever, $n$, for moving the same, the lever $n$ being connected with the spring-bolt $m$ by a rod, $o$. A toothed sector, $p$, is attached to the frame A, and is engaged by the spring-bolt $m$.

D D are seed-boxes placed on the front of the machine, and E E are seed-valves sliding through apertures in the lower portion of the boxes. These valves are provided with holes $q$, for receiving seed from the boxes and delivering it to the dropping-tubes F. The holes $q$ are made adjustable by means of a sliding piece, $r$, that is held in any required position by a screw, $s$, that passes through a slot in the sliding-piece into the valve. The valves E are attached to a cross-bar, G, which is secured to a sliding bar, H. The sliding bar H is provided with guides at the front and rear of the frame A, and with a spiral spring, I, that rests against the front guide, and bears against a shoulder formed on the sliding bar.

$u\ u$ are covers that extend from the sides of the boxes D, over the seed-valves E. J is a rack formed on the under side of the bar H, and K is a mutilated pinion placed on the shaft B, having two or more teeth upon opposite sides, that are capable of engaging with the rack J, and throwing it forward as the machine progresses. The mutilated pinion K is loose upon the shaft, and is provided with a clutch that engages a pin projecting from the shaft B, and also with a shifting-lever, L, that is forked at its lower end, and is placed in a groove in the hub of the pinion.

M is a spring that is placed between the hub of the mutilated pinion K and the drive-wheel C', for the purpose of throwing the said pinion forward, so that its clutch engages with the pin in the shaft B.

The dropping-tubes F are placed behind the plows $c$, so that the seed may be dropped through them into the furrow formed by the plow. Diverging wings $t$ are attached to the lower end of the tube F, and project horizontally rearward for throwing the larger lumps of earth sidewise, so that they may not roll into the furrow and cover the corn. The wheels C C' are placed directly at the rear of the tubes F, and have a tread of sufficient breadth to press the earth at the sides of the furrow sufficiently to cause it to cover the corn.

The operation of the machine is as follows: Corn is placed in the seed-boxes D, and the holes $q$ in the valves E are adjusted, by moving the slides $r$, to receive the required number of kernels. Upon starting the machine, the pinion K engages the rack J, and throws the bar H, and, consequently, the valves E, forward sufficiently to permit the holes $q$ to receive the corn from the boxes D.

The mutilated pinion K, by its continuous forward motion, disengages itself from the rack J, when the bar H is thrown back by the spring I, carrying the valves E with it. When the holes $q$ are over the tubes F, the seed drops through the said tubes into the furrows formed by the plows $c$. They are covered by the wheels C C'.

The plow-points are elevated or depressed by moving the lever $k$, and they may be further adjusted by moving the supports b. The plows are prevented from turning too far back by the chain d.

When it is desired to plant a single row, the aperture in one of the seed-valves E may be closed by moving the sliding piece r, when the valve will be prevented from carrying seed out of the seed-box.

Having thus described my invention, I claim as new and desire to secure by Letters Patent—

1. The combination of the plows c, shaft a, adjustable supports b, levers i and k, and the connecting-rods j, substantially as herein shown and described.

2. The plow-shaft a, journaled in bars b, pivoted at one end and slotted near the other, as set forth, to allow said bars to be clamped at different altitudes.

ROBERT FOX.

Witnesses:
JAS. HALL,
JOHN WALSH,
WILLIAM DEVREAUX.